United States Patent
Suzuki

(10) Patent No.: US 7,936,349 B2
(45) Date of Patent: May 3, 2011

(54) POWER SUPPLY APPARATUS AND FLAT-SCREEN TELEVISION SET

(75) Inventor: Hirotsugu Suzuki, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 804 days.

(21) Appl. No.: 11/899,103

(22) Filed: Sep. 4, 2007

(65) Prior Publication Data

US 2008/0180358 A1 Jul. 31, 2008

(30) Foreign Application Priority Data

Sep. 4, 2006 (JP) ................... 2006-239258

(51) Int. Cl.
  G06F 3/038 (2006.01)
  G09G 5/00 (2006.01)
  G05F 1/00 (2006.01)
  H02J 1/00 (2006.01)
  H05B 37/02 (2006.01)
  H05B 39/04 (2006.01)
  H05B 41/36 (2006.01)

(52) U.S. Cl. .......... 345/212; 345/211; 323/265; 363/15; 315/291

(58) Field of Classification Search .......... 345/211–213; 713/300–340; 348/730; 323/265–290; 363/13–147; 315/201–208, 246–287, 291–311
See application file for complete search history.

(56) References Cited

U.S. PATENT DOCUMENTS

| 7,053,593 B2 * | 5/2006 | Bemat et al. ................... 323/272 |
| 2002/0006045 A1 * | 1/2002 | Shirai et al. ....................... 363/17 |
| 2005/0047176 A1 | 3/2005 | Fukumoto |

FOREIGN PATENT DOCUMENTS

| EP | 1071210 A | 1/2001 |
| EP | 1073188 A | 1/2001 |
| EP | 1073188 A2 * | 1/2001 |
| JP | 10-127061 | 5/1998 |
| JP | 2001-136661 | 5/2001 |
| JP | 2001136661 A * | 5/2001 |
| JP | 2002-041329 | 2/2002 |
| JP | 2002-268909 | 9/2002 |

OTHER PUBLICATIONS

The Extended European Examination report dated Jan. 27, 2011.

* cited by examiner

Primary Examiner — Bipin Shalwala
Assistant Examiner — Ilana Spar
(74) Attorney, Agent, or Firm — Yokoi & Co., U.S.A., Inc.; Toshiyuki Yokoi

(57) ABSTRACT

A safety circuit 16 for monitoring the waveform of a start signal outputted from a microcomputer 40a is provided in a power supply circuit. If a start signal inputted to the safety circuit 16 is not a pulse wave, a power supply cutoff section 16c cuts off the output of the start signal to a DC/AC circuit 13, thereby cutting off the supply of power by the DC/AC circuit 13 from a primary side to a secondary side. Thereby, it is possible to prevent the supply of power by the power supply circuit without providing an additional microcomputer or IC for monitoring a failure and a temporary malfunction of a control microcomputer and to safely prevent the supply of power at the time of a latch-up caused by noise or a breakage.

2 Claims, 8 Drawing Sheets

PRIOR ART

POWER SUPPLY APPARATUS AND FLAT-SCREEN TELEVISION SET

CROSS-REFERENCES TO RELATED APPLICATIONS

The present application is related to the Japanese Patent Application No. 2006-239258, filed Sep. 4, 2006, the entire disclosure of which is expressly incorporated by reference herein.

BACKGROUND OF THE INVENTION

1. Field of the Invention

The present invention relates to a power supply circuit which supplies power from a primary side to a secondary side under the control of a microcomputer and prevents the supply of power from the primary side to the secondary side at the time of occurrence of an abnormality and a flat-screen television set employing the power supply circuit.

2. Description of the Related Art

FIG. 8 is a block diagram showing the configuration of a conventionally known power supply circuit. A power supply circuit 1 generates steady power from primary AC power such as commercial power and supplies it to a secondary side. The power supply circuit 1 includes a rectifier circuit 2 for converting AC voltage to DC voltage, a smoothing circuit 3 for smoothing the converted DC voltage, a switching circuit 4 for converting the smoothed DC voltage to AC voltage again, a main transformer 5 for supplying power while isolating the AC voltage converted by the switching circuit 4 from a secondary side, and secondary power supply circuits 6 which are supplied with predetermined voltages generated by dividing the output voltage of the main transformer 5. Further, according to a microcomputer 7 in a secondary circuit, the power supply circuit 1 performs feedback control of the switching circuit 4 based on an output voltage of the secondary power supply circuits 6.

In the power supply circuit having the above-described configuration, AC power supplied from a primary power supply 200 such as a commercial power supply is rectified by the rectifier circuit 2 and smoothed by the smoothing circuit 3 into DC power. The DC power is converted to AC power again, which is supplied to the secondary power supply circuits 6 isolated by the main transformer 5.

The switching circuit 4 converts input power from DC to AC, under the control of the microcomputer 7 using an activation signal outputted to the switching circuit 4. The switching circuit 4 includes a logic IC 4a which performs PWM control, and the activation signal outputted from the microcomputer 7 is inputted to an input terminal of the logic IC 4a. The activation signal activates the logic IC 4a, which converts power from DC to AC. Further, power outputted through the main transformer 5 is supplied to a plurality of secondary power supply circuits 6a, 6b, and 6c, which boost or reduce input DC power voltage to supply power to circuits.

In the power supply circuit 1, the microcomputer 7 controls the activation of the switching circuit 4. When the microcomputer 7 detects an abnormality in the power supply circuit, the microcomputer 7 stops the activation of the switching circuit 4 to prevent the supply of power to the secondary power supply circuits 6 through the main transformer 5.

However, in the power supply circuit having the above-described configuration, in the case where the microcomputer 7 malfunctions or breaks down, it becomes impossible to prevent the supply of power from the primary side to the secondary side in the power supply circuit 1. The stop of the activation of the microcomputer 7 can be caused by a latch-up or a breakage. In either case, the microcomputer 7 cannot control the switching circuit 4.

On the other hand, there is disclosed a driving control unit for detecting an abnormality of a microcomputer and driving a load even at the time of stop of the microcomputer due to a breakage or the like. The driving control unit includes a reset IC with a watchdog function for outputting a reset pulse at the time of detecting an abnormality of the microcomputer, a driving signal output unit for, upon receiving the reset pulse, integrating a power supply voltage and outputting a driving voltage, and switching means for driving a load using this driving signal.

In the driving control unit, when the microcomputer stops its function, the reset IC with the watchdog function outputs a reset pulse to the driving signal output unit. Upon receiving the reset pulse, the driving signal output unit accumulates a driving signal and outputs it to the switching means, which drives the load (e.g., see Japanese Patent Application Laid-Open No. 2002-268909, which is hereinafter referred to as Patent Document 1).

There is also disclosed an abnormality detection apparatus for detecting a microcomputer that is operating abnormally among a plurality of microcomputers included in a control apparatus.

In the abnormality detection apparatus, one of the microcomputers that has received an abnormality detecting signal transfers the signal to the other microcomputers, and microcomputers that have received the transferred signal send it back to the microcomputer that has sent the signal, thereby detecting an abnormal microcomputer which has not sent it back within a predetermined time (e.g., see Japanese Patent Application Laid-Open No. 2002-41329, which is hereinafter referred to as Patent Document 2).

There is disclosed a method for detecting an abnormal operation of a microcomputer without providing a particular monitoring program or an input/output terminal in a similar control apparatus including a plurality of microcomputers (e.g., see Japanese Patent Application Laid-Open No. 10-127061, which is hereinafter referred to as Patent Document 3).

Further, there is disclosed a power control apparatus for cutting off power based on an abnormality occurrence in a secondary circuit or an instruction from a microcomputer.

In the power control apparatus, a switch is interposed between a primary power supply and a secondary power supply, and a power-off signal is outputted from the secondary power supply in response to an abnormality in the secondary power supply. The power-off signal actuates the switch to cut off power supplied from the primary power supply to the secondary power supply (e.g., see Japanese Patent Application Laid-Open No. 2001-136661, which is hereinafter referred to as Patent Document 4).

There has been the following problem in the invention described in Patent Document 1.

In the case where the IC with the watchdog timer breaks down, it is impossible to perform abnormality processing on the power supply circuit. The IC with the watchdog timer may break down due to a latch-up caused by noise as in the case of the microcomputer. Therefore, in the case where the IC with the watchdog timer breaks down, it becomes impossible to cut off the supply of power from the primary side to the secondary side as in the case of the microcomputer. Further, the invention described in Patent Document 1 drives the load at the time of a failure of the microcomputer, whereas the present invention prevents the supply of power from the primary side to the secondary side to stop the load; therefore, these inventions differ in the objects.

In the inventions described in Patent Documents 2 and 3 which include a plurality of microcomputers, in the case where all the microcomputers break down, it becomes impossible to solve the problem as in the case of the invention described in Patent Document 1. Further, the inventions described in Patent Documents 2 and 3 are based on a plurality of microcomputers, and there is not disclosed a method for stopping the load at the time of detection of an abnormality of a microcomputer as in the case of the present invention.

Further, there has been the following problem in the invention described in Patent Document 4.

The invention described in Patent Document 4 provides a cutoff switch controlled by the microcomputer between the primary side and the secondary side. Therefore, in the case where the microcomputer breaks down, it is impossible to control the switch so that the problem of the present invention cannot be solved.

BRIEF SUMMARY OF THE INVENTION

The present invention has been made in view of the above problem, and it provides a power supply circuit capable of safely preventing the supply of power at the time of a latch-up caused by noise or a breakage without providing an additional microcomputer or IC for monitoring a failure and a temporary malfunction of a control microcomputer and to provide a flat-screen television set employing the power supply circuit.

In order to attain the above object, the invention provides a power supply apparatus, comprising:

a microcomputer and a power supply circuit for supplying power from a primary side to a secondary side under a control of the microcomputer, the microcomputer outputting a pulse signal in a case of a normal activation state, and outputting a signal of one of a high state and a low state in a case of an abnormal activation state caused by one of a latch-up and a failure; pulse determination unit for determining whether the microcomputer outputs a pulse wave;

microcomputer activation determination unit for outputting a Direct Current (DC) microcomputer normal-activation signal if the pulse determination unit detects a pulse wave output; and power supply cutoff unit for preventing the supply of power by the power supply circuit from the primary side to the secondary side if a microcomputer normal-activation signal is not outputted from the microcomputer activation determination unit.

In the power supply apparatus having the above-described configuration, the microcomputer outputs a pulse signal in the case of a normal state, and outputs a signal of either a high state or a low state in the case of a latch-up or a failure. In the case where the microcomputer outputs a pulse wave in a normal activation state, the pulse determination unit determines that a normal pulse wave is outputted and generates a pulse wave. Upon receiving the pulse wave, the microcomputer activation determination unit outputs a DC normal-activation determination signal to the power supply cutoff unit. The power supply cutoff unit prevents the supply of power by the power supply circuit from the primary side to the secondary side to stop the activation of loads if the normal-activation determination signal is not outputted from the microcomputer activation determination unit. Therefore, even when the microcomputer stops due to a latch-up, a breakage, or the like, it is possible to prevent the supply of power from the primary side to the secondary side to stop loads, based on the activation state of the microcomputer.

In place of the signal outputted from the microcomputer, any other pulse wave outputted during the normal activation of the microcomputer can be employed. For example, a block for outputting a pulse wave may be provided in the microcomputer. Accordingly, in another aspect, the invention provides a power supply apparatus including a microcomputer and a power supply circuit for supplying power from a primary side to a secondary side under a control of the microcomputer, the microcomputer having an activation signal output unit for outputting a pulse wave as a normal activation state. The power supply apparatus includes a pulse determination unit for determining whether the activation signal output unit outputs a normal pulse wave; a microcomputer activation determination unit for outputting a DC microcomputer normal-activation signal if the pulse determination unit determines that a normal pulse wave is outputted from the activation signal output unit; and a power supply cutoff unit for preventing the supply of power if a microcomputer normal-activation signal is not outputted from the microcomputer activation determination unit.

In the invention thus constructed, the microcomputer includes an activation signal output unit for representing a normal state by a pulse wave. In the case where the microcomputer is in a normal activation state so that the activation signal output unit outputs a pulse wave, the pulse determination unit determines that a normal pulse wave is outputted and generates a pulse wave. Upon receiving the pulse wave, the microcomputer activation determination unit outputs a DC normal-activation determination signal to the power supply cutoff unit. The power supply cutoff unit prevents the supply of power by the power supply circuit from the primary side to the secondary side to stop the activation of loads if the normal-activation determination signal is not outputted from the microcomputer activation determination unit.

Thus, it is possible to determine the normal state of the microcomputer by using a waveform.

As an example of the activation signal output unit, new logic by which a pulse wave is outputted from an output terminal during the normal activation of the microcomputer may be configured beforehand, or existing signal output may be used.

The activation signal output unit may be configured by using internal logic of the microcomputer. Therefore, in another aspect of the invention, the activation signal output unit is implemented by generating a pulse wave by internal logic of the microcomputer.

In the power supply apparatus having the above-described configuration, the internal logic of the microcomputer continues to output a pulse wave during the normal activation of the microcomputer. This negates the need for a retrofit device and can prevent a malfunction of the power supply apparatus caused by the retrofit device itself, thus making it possible to provide the power supply circuit that is resistant to failures and in a stable activation state. As a specific example of the internal logic, the internal logic may be implemented using a clock signal or the like included beforehand in the microcomputer.

As a specific configuration for generating a pulse wave by the internal logic of the microcomputer, the power supply circuit is configured such that the microcomputer outputs a start signal to the power supply circuit and switching means generates AC power from DC power by changing a duty ratio of the start signal, and the pulse determination unit determines an activation state of the microcomputer by determining a waveform of the start signal outputted from the microcomputer.

In the invention thus constructed, the state of the microcomputer is determined based on the waveform of a start signal outputted from a start signal output terminal of the microcomputer. This can achieve a simple configuration without requiring a retrofit device and therefore provide the power supply circuit that is in a stable activation state without causing a secondary failure such as a failure of the retrofit device.

As another specific configuration for generating a pulse wave by the internal logic of the microcomputer, the microcomputer outputs a clock signal generated based on an oscillation period of an oscillator, and the activation signal output unit is implemented by a clock signal output terminal of the microcomputer.

In the power supply circuit having the above-described configuration, the state of the microcomputer is determined based on a clock signal outputted from the microcomputer. This can achieve a simple configuration without requiring a retrofit device.

As a specific configuration in which the pulse determination unit determines a pulse wave outputted from the activation signal output unit, the pulse determination unit determines that the microcomputer is not in a normal state if a pulse waveform outputted from the microcomputer remains in either a high state or a low state.

In the invention thus constructed, in an abnormal activation state of the microcomputer, a pulse wave outputted from the activation signal output unit remains in either a high state or a low state. Accordingly, the pulse determination unit determines that the microcomputer is not in a normal activation state if a pulse wave outputted from the activation signal output unit remains in either a high state or a low state. This configuration enables a simple method for determining the state of the microcomputer based only on the state of a pulse wave.

As a specific configuration of the pulse determination unit, if a waveform of a signal inputted from the microcomputer is a pulse wave, the pulse determination unit outputs the signal to the microcomputer activation determination unit through a capacitor, and if a waveform of a signal inputted from the microcomputer is not a pulse wave, the pulse determination unit does not output the signal to the microcomputer activation determination unit, thus outputting a determination result as to whether or not the microcomputer is in a normal state.

In the invention thus constructed, the pulse determination unit for determining whether a signal outputted from the microcomputer is a pulse wave is implemented with a capacitor. Thus, with a simple configuration using the capacitor, it is possible to determine whether the signal is a pulse wave.

As a specific configuration of the microcomputer activation determination unit, the microcomputer activation determination unit rectifies the input pulse wave with a diode and smoothes the rectified pulse wave to generate the microcomputer normal-activation signal.

In the invention thus constructed, the microcomputer activation determination unit generates a DC microcomputer normal-activation signal by rectifying the input pulse wave with a diode and smoothing the rectified pulse wave. Thus, the microcomputer activation determination unit can be achieved with a simple configuration using the diode.

As a configuration of the power supply cutoff unit, the power supply cutoff unit cuts off the output of the start signal to the switching unit if the microcomputer normal-activation signal is not outputted from the microcomputer activation determination unit.

In the invention thus constructed, the microcomputer normal-activation signal is outputted during the normal activation of the microcomputer, so that the start signal is outputted to the switching means. Accordingly, the supply of power by the power supply circuit from the primary side to the secondary side is continued. On the other hand, if the microcomputer normal-activation signal is not outputted, the start signal is not outputted to the switching means. Accordingly, the supply of power from the primary side to the secondary side is prevented. With such a configuration, the safety control of the power supply circuit using the microcomputer normal-activation signal can be achieved with a simple configuration. The switching means may be configured with internal logic in an IC, or transistors and relays.

As a specific configuration of the power supply cutoff unit, the power supply cutoff unit has a transistor whose collector is connected to a start signal output terminal of the microcomputer and whose emitter is connected to a ground, and based on the microcomputer normal-activation signal outputted to the power supply cutoff unit, the transistor switches continuity between the collector and the emitter to switch the output of the pulse wave to the switching means.

In the invention thus constructed, with a transistor, the power supply cutoff unit switches whether to output the start signal inputted to the collector from the microcomputer to the ground connected to the emitter, based on the microcomputer normal-activation signal. Thereby, a method for cutting off a signal outputted from the microcomputer can be implemented with a simple configuration using the transistor.

As a specific configuration according to the invention, there is provided a flat-screen television set including a flat-screen display for displaying video, a microcomputer for performing main control, a control board for in accordance with control by the microcomputer, causing the flat-screen display to display video, and a power supply circuit including a rectifier circuit for rectifying commercial power, a DC/AC circuit for converting, using a logic IC, power rectified by the rectifier circuit into AC power, and a main transformer for supplying AC power generated by the DC/AC circuit to the flat-screen display and the control board, the flat-screen television set adjusting AC power voltage generated by the DC/AC circuit by changing a duty ratio of a start signal outputted from the microcomputer and outputting the start signal to the logic IC. The power supply circuit includes a safety circuit which outputs the start signal outputted from a start signal output terminal of the microcomputer to the logic IC if the start signal is a normal pulse wave, and does not output the start signal to the logic IC if the start signal is not a normal pulse wave, thereby preventing the supply of AC power by the DC/AC circuit. The safety circuit includes a pulse determination section which is connected through a capacitor to the start signal output terminal of the microcomputer and passes the start signal inputted through the capacitor if the start signal is a pulse wave, a microcomputer activation determination section which is connected to an output terminal of the pulse determination section and rectifies and smoothes a positive half-wave of an input pulse wave to output a DC microcomputer normal-activation signal, and a power supply cutoff section which includes a first transistor and a second transistor as switches and cuts off the supply of the start signal to the DC/AC circuit by outputting the start signal outputted from the microcomputer to a ground connected to the first transistor by outputting a trigger signal from the second transistor to the first transistor if the microcomputer normal-activation signal is not outputted to the second transistor, the first transistor having a collector connected to the start signal output terminal of the microcomputer, a emitter connected to the ground, and a base connected to a trigger signal output section for outputting a trigger signal, and the second transistor having a collector connected to the base of the first transistor and to the trigger signal output section for outputting the trigger signal, a base connected to an output terminal of the microcomputer activation determination section, and a emitter connected to the ground.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

A power supply circuit according to the present invention will be specifically described, based on a flat-screen television set with the power supply circuit. However, the power supply circuit according to the invention is not limited to use in the flat-screen television set, and can be applied to any apparatus that employs a power supply circuit using a microcomputer to control the supply of power.

Figure 1:
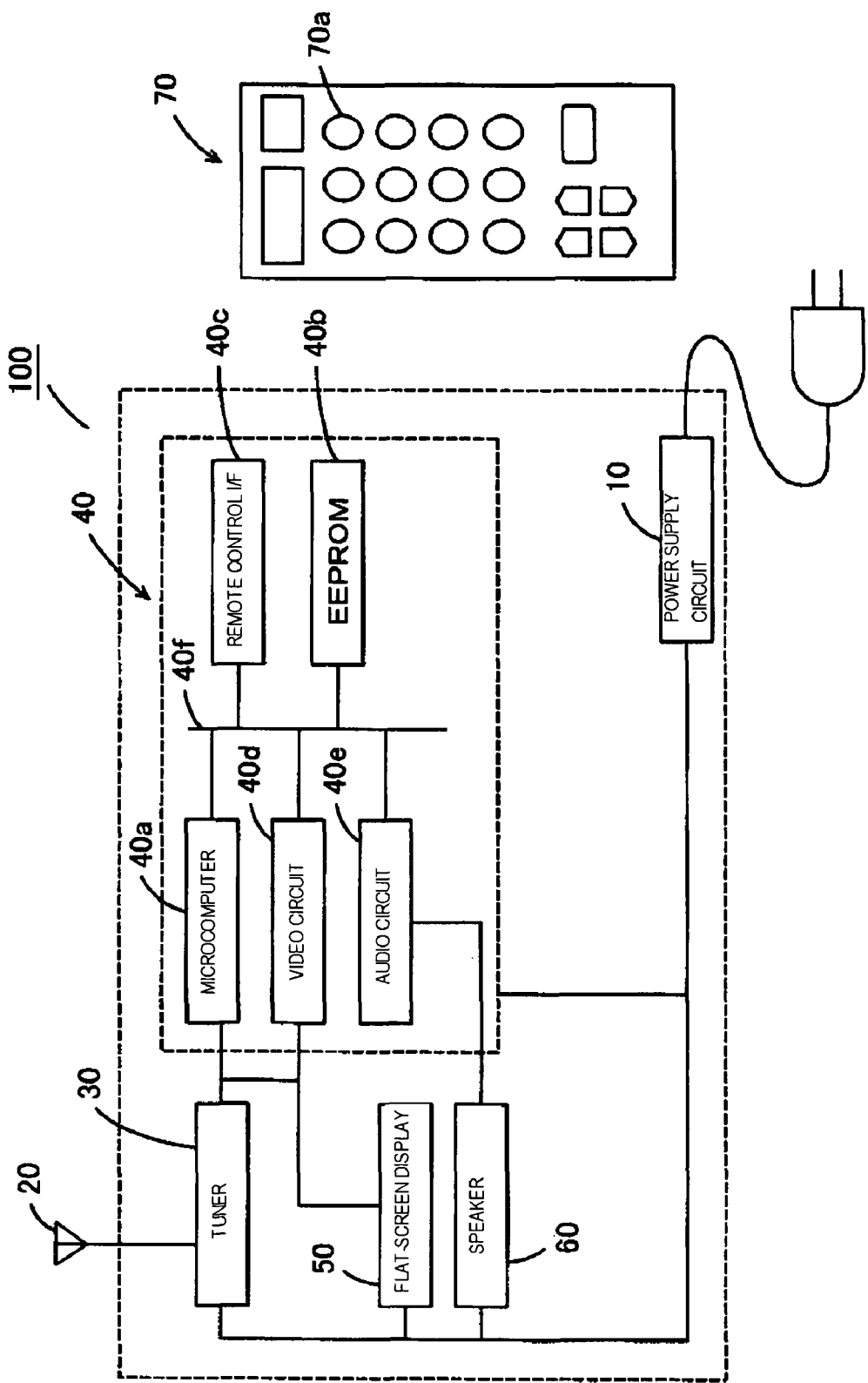
FIG. 1 is an exemplary illustration of a block diagram of a flat-screen television set.

Hereinafter, embodiments of the invention will be described in the following order.
(1) First Embodiment
(2) Configuration of Power Supply Circuit
(3) Summary of First Embodiment
(4) Second Embodiment
(5) Summary of Second Embodiment (1) First Embodiment Hereinafter, a first embodiment embodying the flat-screen television set according to the invention will be described with reference to FIG. 1. FIG. 1 is a block diagram of the flat-screen television set. The flat-screen television set 100 outputs video and audio based on a television broadcast received by an antenna. Accordingly, the flat-screen television set is configured with a tuner 30 for extracting specified video and audio signals from television broadcasts received by an antenna 20, a control board 40 for performing predetermined signal processing on the video and audio signals generated by the tuner 30, a flat-screen display 50 for displaying video based on the video signal on which the control board 40 has performed the signal processing, a speaker 60 for outputting audio based on the audio signal on which the control board 40 has performed the signal processing, and a power supply circuit 10 for supplying power to the control board 40, the flat-screen display 50, and the speaker 60.

When, with the power supply circuit 10 connected via an outlet to a commercial power supply, the flat-screen television set 100 having the above-described configuration is turned on using a remote control unit, the power supply circuit 10 generates steady power based on commercial power to generate power supply voltages for activating the control board 40, the flat-screen display 50, and the speaker 60. In this state, when a user selects a channel by operating a channel key 70a of the remote control unit 70, the tuner 30 extracts a video signal and an audio signal corresponding to the channel selected with the remote control unit 70 from television broadcasts received by the antenna 20. The tuner 30 according to the embodiment of the invention is a PLL tuner capable of receiving both analog and digital broadcasts. However, the tuner 30 is not limited thereto and may be one that receives only digital broadcasts or analog broadcasts.

The video signal and the audio signal extracted by the tuner 30 are outputted to the control board 40, where predetermined signal processing is performed under the control of a microcomputer 40a. The control board 40 is configured with the microcomputer 40a, an EEPROM 40b for storing a program by which the microcomputer 40a performs predetermined arithmetic processing, a remote control I/F 40c for receiving a control signal and outputting it to the microcomputer 40a, a video circuit 40d for performing predetermined signal processing on the video signal extracted by the tuner 30, and an audio circuit 40e for performing predetermined signal processing on the audio signal extracted by the tuner 30. The above-described circuits are connected to each other via a bus 40f and exchange signals and data via the bus 40f under the control of the microcomputer 40a.

With the configuration of the control board 40, when the tuner 30 outputs the video signal, the microcomputer 40a outputs the video signal to the video circuit 40d. The video circuit 40d performs signal processing such as brightness correction and gamma correction on the input video signal and outputs the corrected video signal to the flat-screen display 50. Similarly, the microcomputer 40a outputs the audio signal inputted to the control board 40 to the audio circuit 40e. The audio circuit 40e amplifies the audio signal based on a volume adjustment instruction from the user using the remote control unit 70 and outputs the amplified audio signal to the speaker 60. With the above-described configuration, the flat-screen television set 100 according to the invention outputs video and audio. The flat-screen display 50 according to the embodiment of the invention denotes a plasma display, a liquid crystal display, and a cathode ray tube. In the block diagram of FIG. 1, the control board 40 and the power supply circuit 10 are disposed on different boards. However, the control board 40 and the power supply circuit 10 may be disposed on the same board without being limited to the block diagram of FIG. 1.

(2) Configuration of Power Supply Circuit

Figure 2:
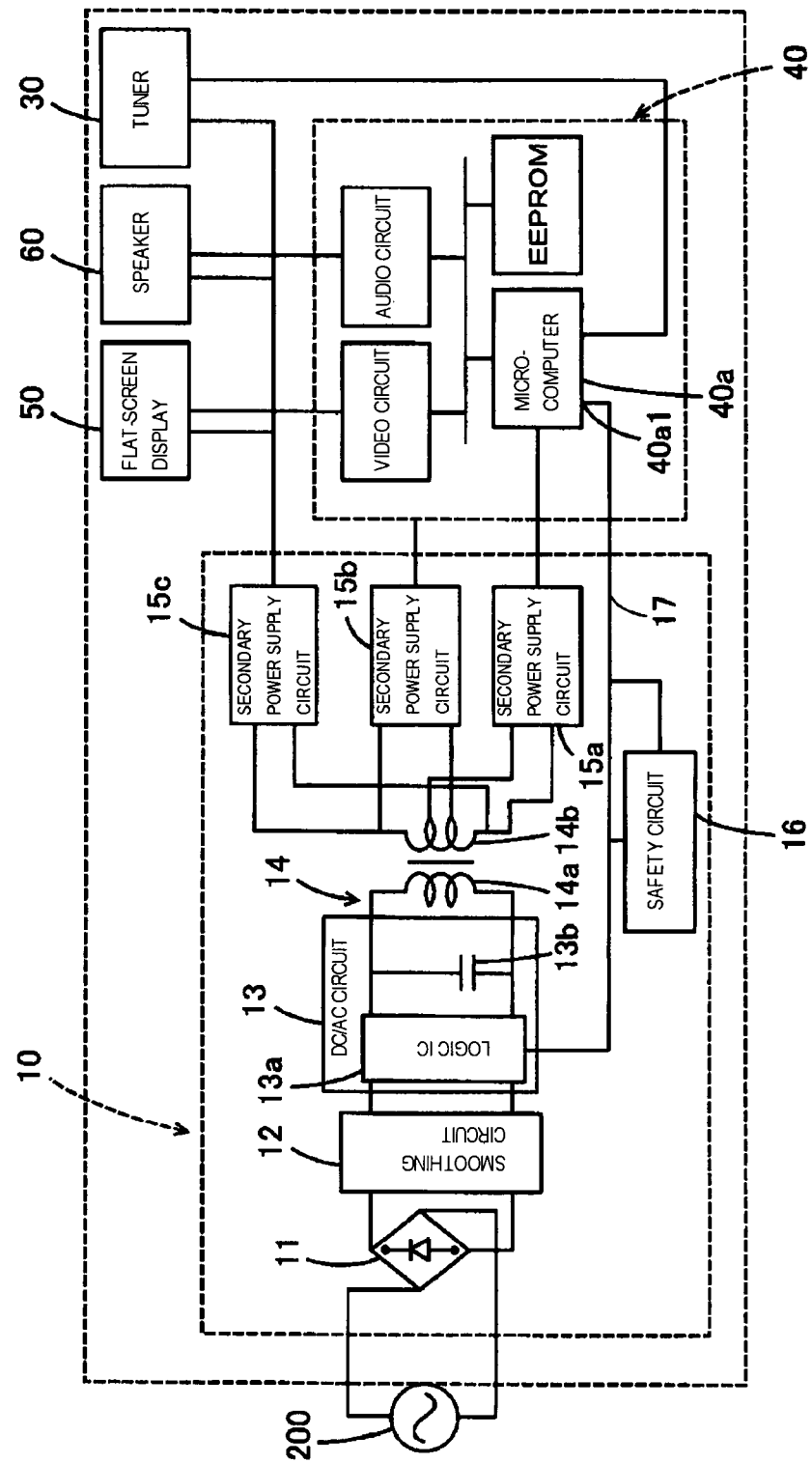
FIG. 2 is an exemplary illustration of a block diagram showing the configuration of a power supply circuit and the relationship between the power supply circuit and circuits supplied with power from the power supply circuit.

Next, the configuration of the power supply circuit 10 according to the embodiment of the invention will be described with reference mainly to FIG. 2. FIG. 2 is a block diagram showing the configuration of the power supply circuit according to the invention and the relationship between the power supply circuit and circuits supplied with power from the power supply circuit. The power supply circuit 10 generates steady power from commercial power and supplies power for driving the flat-screen television set 100. In order to achieve this function, the power supply circuit 10 is configured with a rectifier circuit 11 for rectifying the commercial power, a smoothing circuit 12 for smoothing the rectified power, a DC/AC circuit 13 for converting the DC power into AC power again, a main transformer 14 for isolating the power generated by the DC/AC circuit 13 from secondary circuits and outputting power to the secondary circuits by induction, and secondary power supply circuits 15a, 15b, and 15c for supplying power to the control board 40. The DC/AC circuit 13 is connected to the microcomputer 40a of the control board 40 through a safety circuit 16.

Hereinafter, the function of the power supply circuit 10 will be described. With the power supply circuit 10 connected via an outlet to a commercial power supply 200, a voltage of 100 VAC supplied from the commercial power supply 200 is converted by the rectifier circuit 11 and the smoothing circuit 12 into a DC voltage, which is then outputted to the DC/AC circuit 13. When the user operates a power key on the remote control unit 70, the microcomputer 40a outputs a pulsed start signal to the DC/AC circuit 13 through a start signal output terminal 40a1, according to internal logic. The start signal as a pulse wave having a predetermined voltage is outputted from the microcomputer 40a to the DC/AC circuit 13. Upon receiving the start signal from the microcomputer 40a, the DC/AC circuit 13 converts the rectified DC power into AC power again and outputs the AC power to a primary coil 14a of the main transformer 14.

Figure 3:
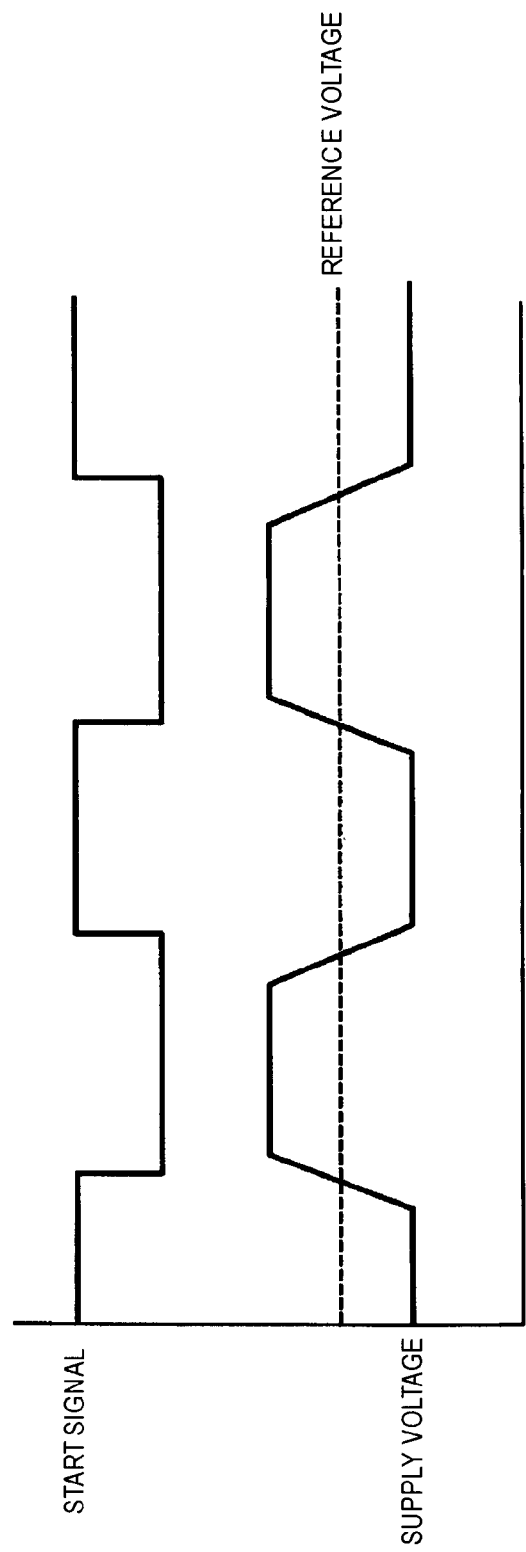
FIG. 3 is an exemplary illustration of a diagram showing the relationship between AC power generated in a logic IC and a start signal inputted from a microcomputer.

The DC/AC circuit 13 according to the embodiment of the invention generates AC power from DC power inputted by switching operation of a logic IC 13a (switching means). The internal logic of the logic IC 13a generates AC power based on the duty ratio of the pulse wave as the start signal from the microcomputer 40a. FIG. 3 is a diagram showing the relationship between the AC power generated in the logic IC 13a and the start signal inputted from the microcomputer 40a. According to FIG. 3, in the normal activation state of the power supply circuit 10, the microcomputer 40a first outputs a start signal in a high state to the logic IC 13a for a predetermined duration. Thereby, the logic IC 13a charges rectified voltage into a capacitor 13b to boost electromotive force to a specified voltage, thus generating a positive half-wave of the AC power. Then, the microcomputer 40a outputs the start signal in a low state to the logic IC 13a for a predetermined duration. Thereby, the logic IC 13a stops the application of voltage into the capacitor 13b, and the capacitor 13b discharges the charged voltage to the main transformer 14. The duty ratio between the low state and the high state of the start signal continues for a certain duration, thereby forming a negative half-wave of the output voltage.

The duty ratio of the start signal is implemented based on a clock signal included in the microcomputer 40a. More specifically, a timer determines the duty ratio between the high state and the low state of the start signal, based on the clock signal oscillated in the microcomputer. Thus, the AC power generated in the DC/AC circuit 13 is applied to the primary coil of the main transformer 14 and induced in a secondary coil 14b. Generated voltage is divided to be applied to the secondary power supply circuits 15a, 15b, and 15c.

The secondary power supply circuits 15a, 15b, and 15c supply power to elements constituting the flat-screen television set 100 based on the power supplied from the main transformer 14. The secondary power supply circuits 15a, 15b, and 15c are connected in states of different winding ratios in the secondary coil 14b of the main transformer 14 and are supplied with power generated by the DC/AC circuit 13 by voltage division. As a specific example of the power generated by the secondary power supply circuits 15a, 15b, and 15c, the secondary power supply circuit 15a generates a voltage of 3.3 VDC for activating the microcomputer 40a. The secondary power supply circuit 15b generates 5V power for driving the control board 40 other than the microcomputer 40a. The secondary power supply circuit 15c generates power for driving the flat-screen display 50, the speaker 60, and the tuner 30. Although the number of secondary power supply circuits according to the embodiment of the invention is three, it is not limited thereto and can be changed in accordance with the number of power supply voltages.

In the above-described state, when a power supply voltage outputted from the secondary power supply circuit 15a becomes higher than a predetermined value, that is, an overvoltage state, or becomes extremely low, the microcomputer 40a changes the duty ratio of the start signal outputted to the DC/AC circuit 13 to control an AC power supply voltage generated in the DC/AC circuit 13. This adjusts a voltage applied to the main transformer 14 and thereby adjusts voltages supplied to the secondary power supply circuits 15a, 15b, and 15c. Thus, the power supply circuit 10 safely supplies power to the secondary side, under the control of a microcomputer 40a.

However, there are cases where the microcomputer 40a does not normally control the power supply circuit 10 due to a failure of the microcomputer 40a. The failure of the microcomputer 40a includes a breakage of the microcomputer 40a itself and a latch-up caused by noise. In this state, the microcomputer 40a continues to output a start signal only in the high state or the low state, that is, a non-pulse wave. In such a state, the DC/AC circuit 13 does not stably generate AC power. Supplying a voltage generated by the DC/AC circuit 13 exceeding a reference voltage to the secondary side causes failures of the power supply circuit 10 and the secondary circuits. In the embodiment of the invention, the safety circuit 16 detects an abnormality of the microcomputer 40a. Hereinafter, the specific configuration and function of the safety circuit 16 will be described with reference to FIG. 4.

Figure 4:
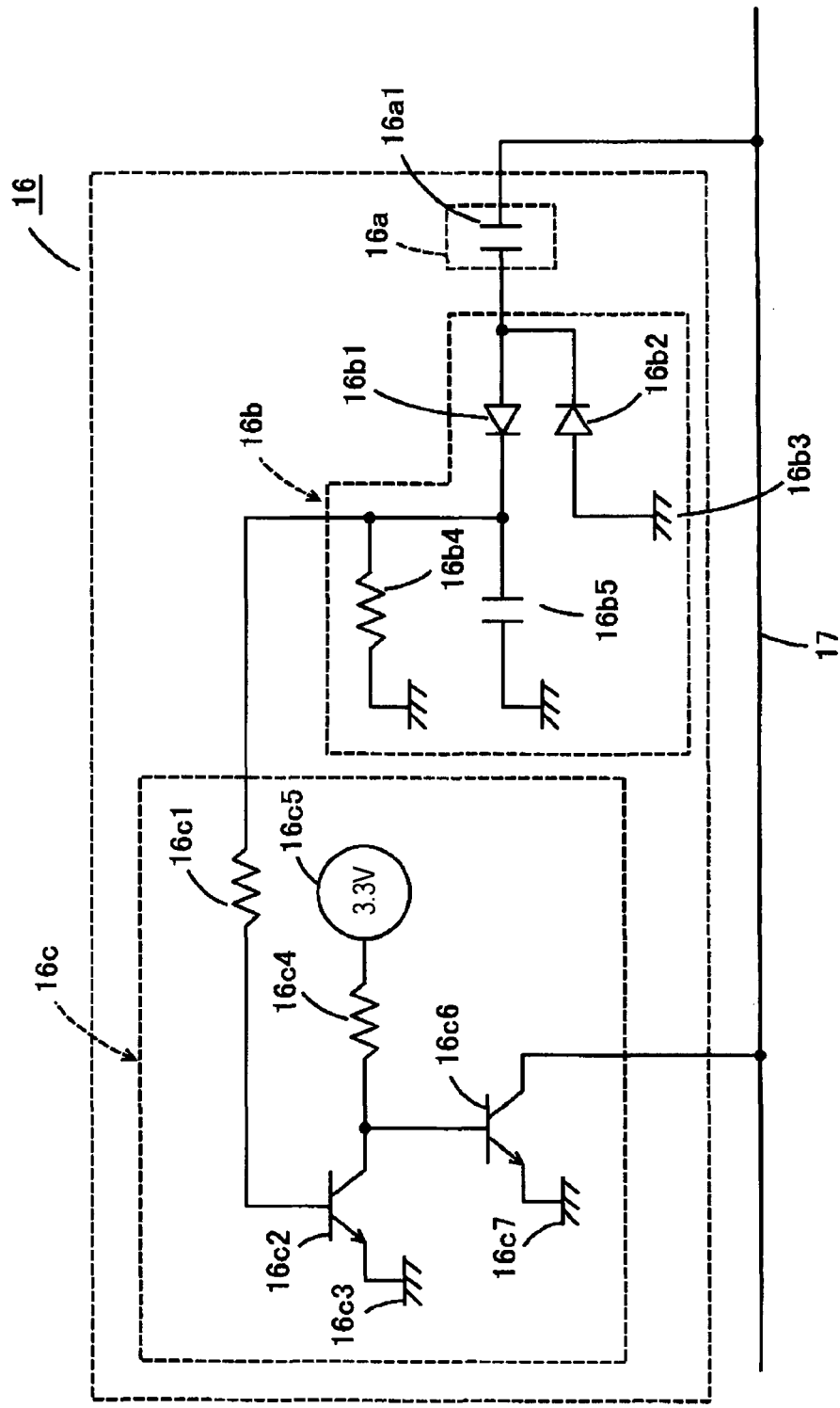
FIG. 4 is an exemplary illustration of a diagram showing the configuration of a safety circuit.

FIG. 4 is a diagram showing the configuration of the safety circuit. The safety circuit 16 cuts off the supply of power from the primary side to the secondary side, based on the waveform of a start signal. Accordingly, the safety circuit 16 is configured with a capacitor 16a1 as a pulse determination section 16a for passing only pulses, a microcomputer activation determination section 16b for generating a microcomputer normal-activation signal by rectifying and smoothing the pulse wave that has passed through the capacitor 16a1, and a power supply cutoff section 16c for cutting off a start signal outputted from the microcomputer 40a to the DC/AC circuit 13 based on the microcomputer normal-activation signal generated by the microcomputer activation determination section 16b. With this configuration, if a start signal inputted to the safety circuit 16 is not a pulse wave, the power supply cutoff section 16c cuts off the output of the start signal to the DC/AC circuit 13, thereby cutting off the supply of power from the primary side to the secondary side. Hereinafter, the specific configuration of each section will be described.

The pulse determination section 16a determines whether a start signal inputted to the safety circuit 16 is a pulse wave. The pulse determination section 16a according to the embodiment of the invention uses a capacitor to determine whether the input start signal is a pulse wave. The capacitor 16a1 passes only AC and cuts off DC. Therefore, if the start signal is a pulse wave, the capacitor 16a1 outputs the start signal to the microcomputer activation determination section 16b. On the other hand, if the start signal is not a pulse wave, the capacitor 16a1 does not output the start signal to the microcomputer activation determination section 16b. Thus, the pulse determination section 16a achieves pulse determination unit.

In the microcomputer activation determination section 16b, a diode 16b1 and a diode 16b2 are connected to the output terminal of the capacitor 16a1, and the diode 16b2 is connected in a reverse direction with respect to the diode 16b1. Further, the output terminal of the diode 16b2 is connected to a ground 16b3. On the other hand, the output terminal of the diode 16b1 is connected to a smoothing capacitor 16b5 and a resistor 16b4. Thereby, the negative half-wave of the pulse wave that has passed through the capacitor 16a1 passes through the diode 16b2 and is outputted to the ground 16b3. Further, the positive half-wave of the pulse wave that has passed through the capacitor 16a1 passes through the diode 16b1 and is smoothed by the smoothing capacitor 16b5 and outputted to the power supply cutoff section 16c through the use of the resistor 16b4. Thereby, the start signal as the pulse wave inputted to the microcomputer activation determination section 16b changes to a microcomputer normal-activation signal composed only of a positive component. Thus, the microcomputer activation determination section 16b achieves microcomputer activation determination unit for outputting a DC microcomputer normal-activation signal.

The power supply cutoff section 16c is connected to the output terminal of the microcomputer activation determination section 16b through a resistor 16c1. The power supply cutoff section 16c includes a first transistor 16c2 for outputting a start signal to a ground by flowing a trigger signal into its base and a second transistor 16c2 for switching whether to output a trigger signal to the base of the first transistor 16c2. The specific circuit configuration of the power supply cutoff section 16c will be described below. The output terminal of the resistor 16c1 connected to the microcomputer activation determination section 16b is connected to the base of the second transistor 16c2. The collector of the second transistor 16c2 is connected through a resistor 16c4 to a trigger signal output section 16c5 for outputting a trigger signal, and the emitter is connected to a ground 16c3. Further, the emitter of the first transistor 16c2 is connected to a ground 16c7, and the collector is connected to a signal line 17 between the microcomputer 40a and the DC/AC circuit 13, to which a start signal is outputted.

Figure 5:
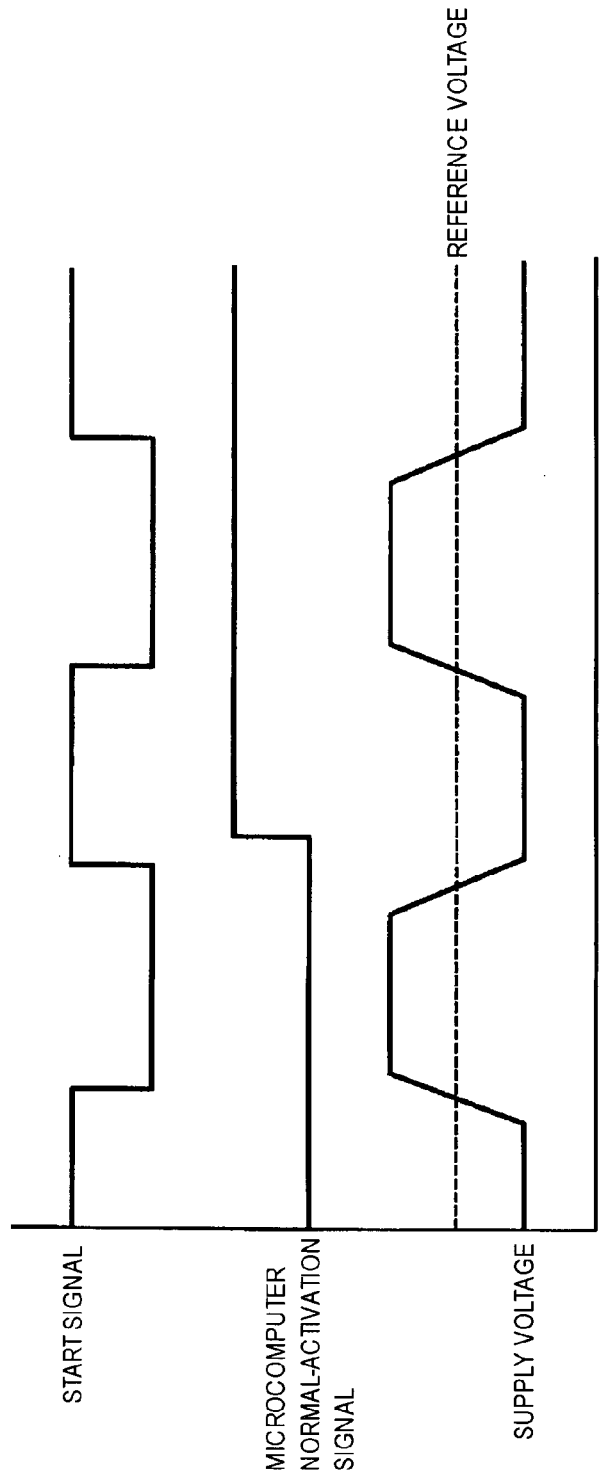
FIG. 5 is an exemplary illustration of a diagram showing an operation of the safety circuit and a power supply voltage supplied from a DC/AC circuit when a start signal of a pulse wave is outputted.
Figure 6:
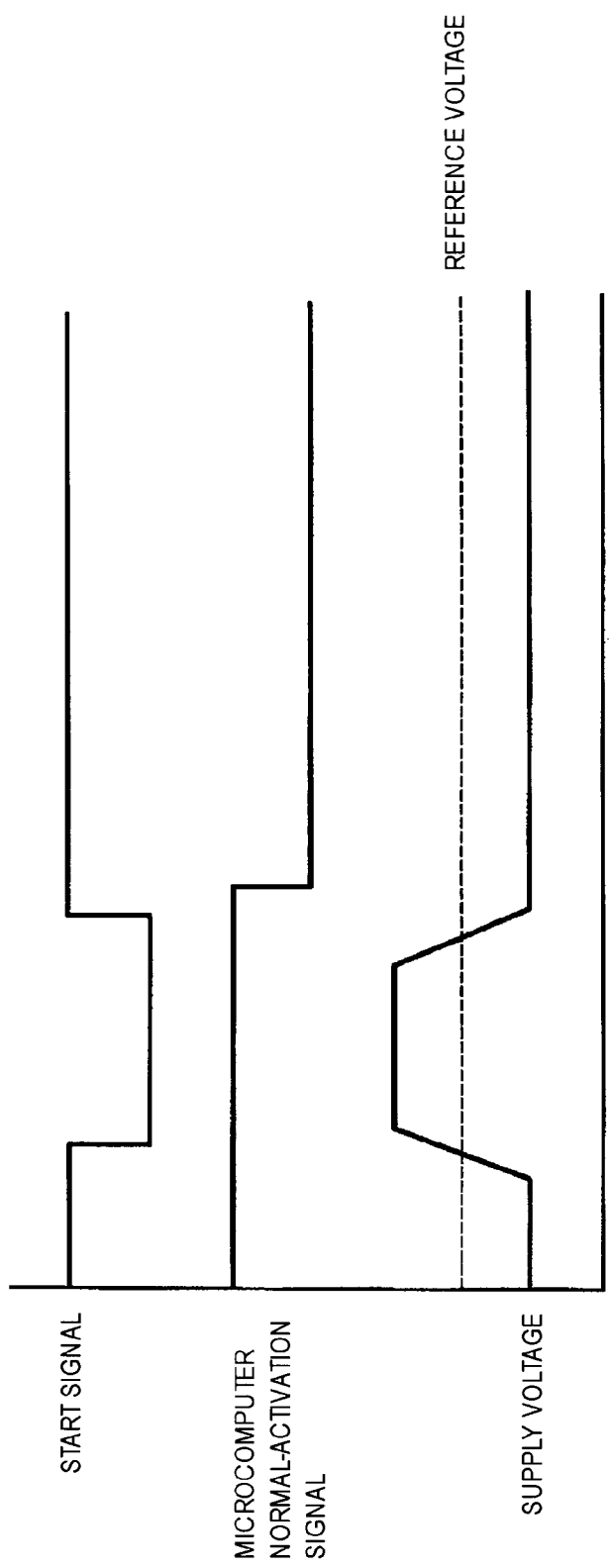
FIG. 6 is an exemplary illustration of a diagram showing an operation of the safety circuit and a power supply voltage supplied from the DC/AC circuit when a start signal of a non-pulse wave is outputted.

The flow of signals of the safety circuit 16 having the above-described configuration and the power supply circuit 10 will be described. FIG. 5 is a diagram showing an operation of the safety circuit 16 and a power supply voltage supplied from the DC/AC circuit when a start signal of a pulse wave is outputted. FIG. 6 is a diagram showing an operation of the safety circuit 16 and a power supply voltage supplied from the DC/AC circuit when a start signal of a non-pulse wave is outputted. In FIG. 5, when a start signal of a pulse wave is outputted to the pulse determination section 16a, the capacitor 16a1 outputs the start signal to the microcomputer activation determination section 16b. The microcomputer activation determination section 16b generates and outputs a microcomputer normal-activation signal from the input start signal. The microcomputer normal-activation signal outputted from the microcomputer activation determination section 16b causes a current to flow into the base of the second transistor 16c2 through the resistor 16c1.

With the above-described flow, continuity is established between the collector and the emitter of the second transistor 16c2, and a 3.3-volt trigger signal is applied from the trigger signal output section 16c5 to the resistor 16c4. Therefore, the trigger signal flows into the ground 16c3 and does not flow into the base of the first transistor 16c6. Thereby, the start signal flowing through the signal line 17 is not cut off and is outputted to the DC/AC circuit 13. In this state, the DC/AC circuit 13 supplies power to the secondary circuits.

On the other hand, when a pulse wave is not outputted to the pulse determination section 16a, as shown in FIG. 6, the start signal cannot pass through the capacitor 16a1, and a microcomputer normal-activation signal is not supplied to the power supply cutoff section 16c. Thereby, a current does not flow into the base of the second transistor 16c2, and a trigger signal outputted from the trigger signal output section 16c5 causes a current to flow into the base of the first transistor 16c6 through the resistor 16c4. Therefore, continuity is established between the signal line 17 connected to the collector of the first transistor 16c6 and the ground 16c7 connected to the emitter of the first transistor 16c6. Thereby, the start signal flowing through the signal line 17 for output to the DC/AC circuit 13 is pulled down to the ground 16c7 and cut off. In this state, since the driving of the DC/AC circuit 13 is stopped, the DC/AC circuit 13 does not supply power to the secondary circuits. Thus, the power supply cutoff section 16c achieves power supply cutoff means for preventing the supply of power from the primary side of the power supply circuit 10 to the secondary side.

(3) Summary of First Embodiment

With the above-described safety circuit 16, if a start signal is a pulse wave, the start signal outputted from the microcomputer 40a drives the DC/AC circuit 13 of the power supply circuit 10 to supply power from the primary side to the secondary side. On the other hand, if a start signal is not a pulse wave due to a failure of the microcomputer 40a, the safety circuit 16 stops the driving of the DC/AC circuit 13 by cutting off the start signal outputted from the microcomputer 40a to the DC/AC circuit 13 to prevent the supply of power from the primary side to the secondary side. Thereby, it is possible to prevent the supply of power at the time of a latch-up caused by noise or a breakage without providing an additional microcomputer or IC for monitoring a failure and a temporary malfunction of the microcomputer 40a.

(4) Second Embodiment

In the first embodiment, the safety circuit determines the activation state of the microcomputer 40a based on the waveform of a start signal to control the driving of the power supply circuit 10. However, the activation state of the microcomputer 40a can be determined based not only on the start signal but also on any other pulse wave having a fixed duty ratio. In the second embodiment of the invention, in the normal activation state of the microcomputer 40a, a pulse wave having a fixed duty ratio is outputted and used to control the driving of the power supply circuit 10. Hereinafter, a specific configuration according to the second embodiment will be described with reference to FIG. 7.

Figure 7:
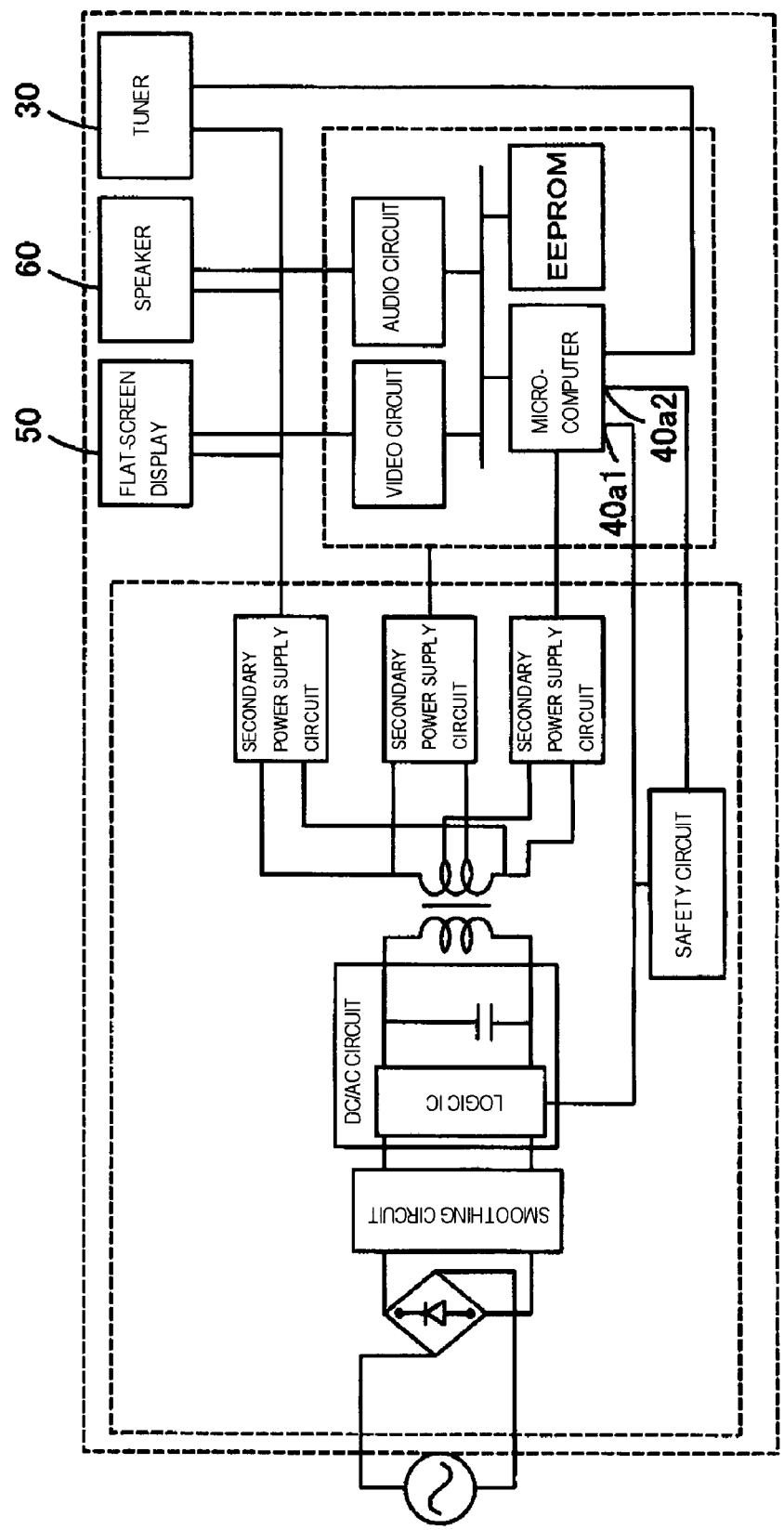
FIG. 7 is an exemplary illustration of a block diagram showing the connection according to a second embodiment between the power supply circuit and the microcomputer.
Figure 8:
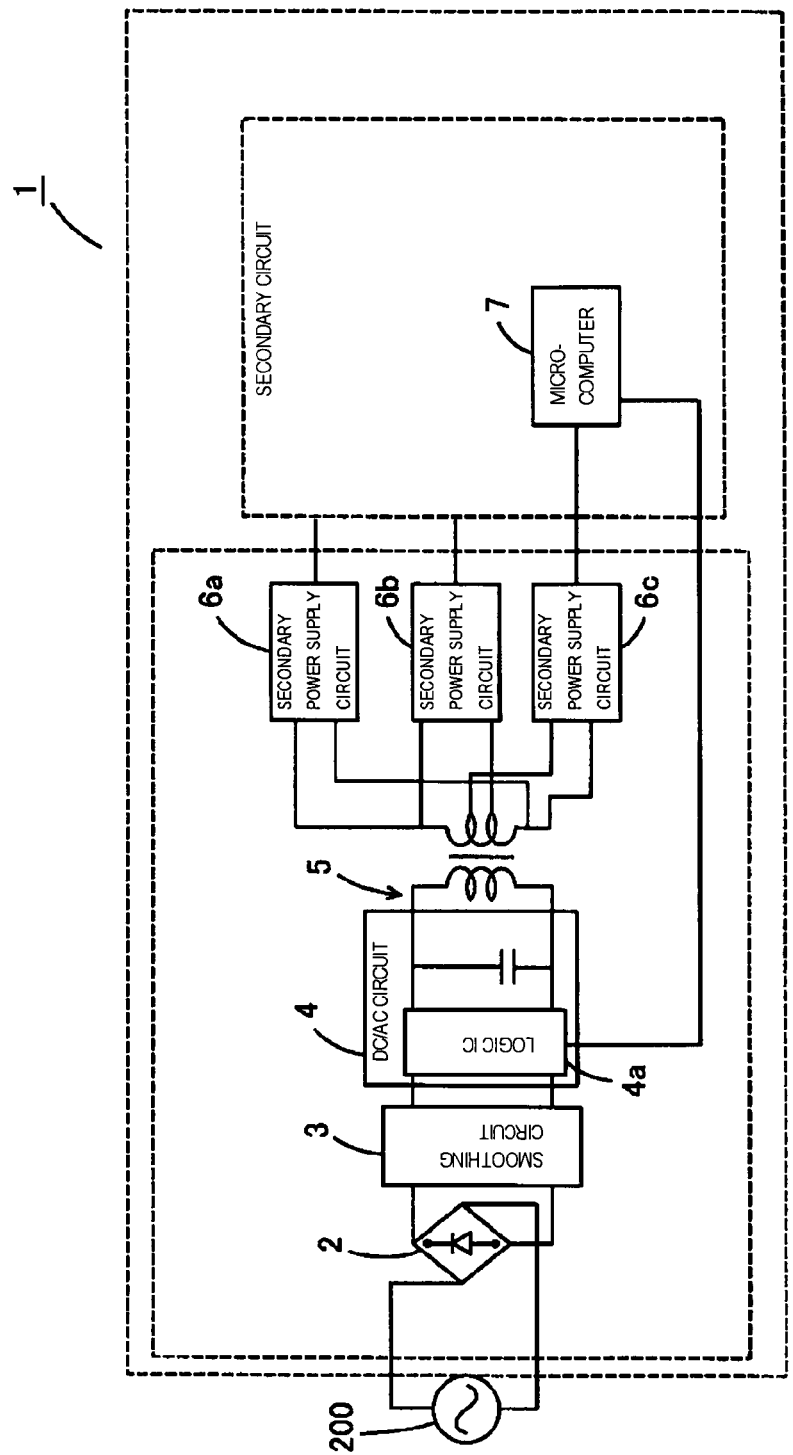
FIG. 8 is an exemplary illustration of a block diagram showing the configuration of a conventionally known power supply circuit.

FIG. 7 is a block diagram showing the connection according to the second embodiment between the power supply circuit and the microcomputer. Since FIG. 7 is the same as FIG. 2 except that the microcomputer 40a are connected at a clock signal output terminal and a start signal output terminal to the safety circuit 16, the configuration of the power supply circuit 10 will not be described. A clock signal based on a predetermined oscillation period of an oscillator included in the microcomputer 40a is outputted from the clock signal output terminal 40a2, and is used for the count of the period of a start signal and various periods for the driving of the flat-screen television set 100. In FIG. 7, the clock signal output terminal 40a2 is connected to the input terminal of the capacitor 16a1 in the safety circuit 16, and the start signal output terminal 40a1 is connected to the collector of the first transistor 16c6 in the safety circuit 16.

With the configuration of the power supply circuit 10, when a clock signal with a predetermined duty ratio is outputted from the microcomputer 40a to the safety circuit 16, the safety circuit 16 does not cut off a start signal flowing through the signal line 17. Thereby, the start signal drives the logic IC 13a of the DC/AC circuit 13 to supply power from the primary side to the secondary side. On the other hand, when a latch-up caused by noise stops the activation of the microcomputer 40a, a clock signal is not outputted from the clock signal output terminal 40a2 of the microcomputer 40a. Accordingly, the clock signal is not outputted to the safety circuit 16, so that the first transistor 16c6 cuts off the start signal flowing through the signal line 17 by flowing it into the ground 16c7. Thereby, the start signal is not inputted to the logic IC 13a of the DC/AC circuit 13, so that the DC/AC circuit 13 prevents the supply of power from the primary side to the secondary side.

(5) Summary of Second Embodiment

As described above, in the second embodiment, the safety circuit determines the activation state of the microcomputer 40a based on the output state of a clock signal to control the supply of power by the DC/AC circuit 13 from the primary side to the secondary side. Thereby, it is possible to prevent the supply of power by the power supply circuit 10 without providing an additional microcomputer or IC for monitoring a failure and a temporary malfunction of the microcomputer 40a. Therefore, it is possible to provide a safety device for the power supply circuit resistant to a latch-up caused by noise and a breakage.

While the invention has been particularly shown and described with respect to preferred embodiments thereof, it should be understood by those skilled in the art that the foregoing and other changes in form and detail may be made therein without departing from the sprit and scope of the invention as defined in the appended claims.

Needless to say, the invention is not limited to the aforesaid embodiments. A person with ordinary skill in the art would readily appreciate variances described below as embodiments of the invention.

A variance in which any of the members or circuit elements disclosed in one of the embodiments are appropriately combined with any of those disclosed in the other embodiments and exchangeable with the members or circuit elements.

A variance in which the members or circuit elements disclosed in the embodiments are appropriately exchanged with those disclosed in related arts but not disclosed in the embodiments or appropriately combined with one another.

A variance in which the members or circuit elements disclosed in the embodiments are appropriately exchanged with those thought to be substitutes by a person with ordinary skill in the art but not disclosed in the embodiments, and appropriately combined with one another.

What is claimed is:

1. A flat-screen television set, comprising:
a flat-screen display (50) for displaying video, a microcomputer (40a) for performing main control, a control board (40) for causing the flat-screen display (50) to display video in accordance with a control by the microcomputer (40a);
a power supply circuit (10) including a rectifier circuit (11) for rectifying commercial power;
a DC/AC circuit (13) for converting, using a logic IC (13a), power rectified by the rectifier circuit (11) into AC power;
a main transformer (14) for supplying AC power generated by the DC/AC circuit (13) to the flat-screen display (50) and the control board (40);
the flat-screen television set adjusting AC power voltage generated by the DC/AC circuit (13) by changing a duty ratio of a start signal outputted from the microcomputer (40a) and outputting the start signal to the logic IC (13a),
the power supply circuit (10) comprising a safety circuit (16) that outputs the start signal outputted from a start signal output terminal (40a1) of the microcomputer (40a) to the logic IC (13a) if the start signal is a normal pulse wave, and does not output the start signal to the logic IC (13a) if the start signal is not a normal pulse wave, thereby stopping the supply of AC power by the DC/AC circuit (13),
the safety circuit (16), including:
a pulse determination section (16a) for determining whether the start signal output by the microcomputer (40a) is a pulse wave,
the pulse determination section (16a) is comprised of a capacitor (16a1) that passes only AC and cuts off DC, and
the pulse determination section (16a) outputs the start signal if the start signal is a pulse wave and does not output the start signal if the start signal is not a pulse wave;
a microcomputer activation determination section (16b) for changing the pulse wave of the start signal to a microcomputer normal-activation signal composed only of a positive component,
the microcomputer activation determination section (16b) is comprised of a diode (16b1), that is connected to output terminal of the capacitor (16a1) and passes through a positive half-wave of the start signal, a smoothing capacitor (16b5) and a resistor (16b4) those are connected to the output terminal of the diode (16b1) and change the start signal to the microcomputer normal-activation signal composed only of a positive component; and a power supply cutoff section (16c) for cutting off the supply of power from the primary side to the secondary side based on the waveform of the start signal, the power supply cutoff section (16c) is comprised of a first transistor (16c6), a second transistor (16c2) and a trigger signal output section (16c5), the second transistor (16c2) having a base connected to the microcomputer activation determination section (16b) via a resistor (16c1), a collector connected to the trigger signal output section (16c5) via a resistor (16c4) and an emitter connected to a ground (16c3), the first transistor (16c6) having a collector connected to the start signal output terminal (40a1) via a line (17), an emitter connected to a ground (16c7) and a base connected to the collector of the second transistor (16c2), the trigger signal output section (16c5) outputting a trigger signal for causing a current to flow into the base of the first transistor (16c6) when a pulse wave is not outputted to the pulse determination section (16a), and when the start signal is a pulse wave, the trigger signal passes through between the collector and the emitter of the second transistor (16c2) instead of flowing into the base of the first transistor (16c6).

2. A power supply apparatus, comprising:

a microcomputer (40a) and a power supply circuit (10) that includes a DC/AC circuit (13) for supplying power from a primary side to a secondary side under a control by the microcomputer (40a), the microcomputer (40a) outputting a pulse wave as a start signal through a start signal output terminal (40a1) in a case of a normal activation state, and outputting a continuous high state signal or a continuous low state signal in a case of an abnormal activation state caused by one of a latch-up and a failure;

a pulse determination section (16a) for determining whether the start signal output by the microcomputer (40a) is a pulse wave, the pulse determination section (16a) is comprised of a capacitor (16a1) that passes only AC and cuts off DC, and the pulse determination section (16a) outputs the start signal if the start signal is a pulse wave and does not output the start signal if the start signal is not a pulse wave;

a microcomputer activation determination section (16b) for changing the pulse wave of the start signal to a continuous microcomputer normal-activation signal composed only of a positive component while the start signal is inputted, the microcomputer activation determination section (16b) is comprised of a diode (16b1), that is connected to output terminal of the capacitor (16a1) and passes through a positive half-wave of the start signal, a smoothing capacitor (16b5) and a resistor (16b4) those are connected to the output terminal of the diode (16b1) and change the start signal to the microcomputer normal-activation signal composed only of a positive component; and a power supply cutoff section (16c) for cutting off the supply of power from the primary side to the secondary side based on the waveform of the start signal, the power supply cutoff section (16c) is comprised of a first transistor (16c6), a second transistor (16c2) and a trigger signal output section (16c5), the second transistor (16c2) having a base connected to the microcomputer activation determination section (16b) via a resistor (16c1), a collector connected to the trigger signal output section (16c5) via a resistor (16c4) and an emitter connected to a ground (16c3), the first transistor (16c6) having a collector connected to the start signal output terminal (40a1) via a line (17), an emitter connected to a ground (16c7) and a base connected to the collector of the second transistor (16c2), the trigger signal output section (16c5) outputting a trigger signal for causing a current to flow into the base of the first transistor (16c6) when a pulse wave is not outputted to the pulse determination section (16a), and when the start signal is a pulse wave, the trigger signal passes through between the collector and the emitter of the second transistor (16c2) instead of flowing into the base of the first transistor (16c6).

* * * * *